United States Patent Office 3,115,130
Patented Dec. 24, 1963

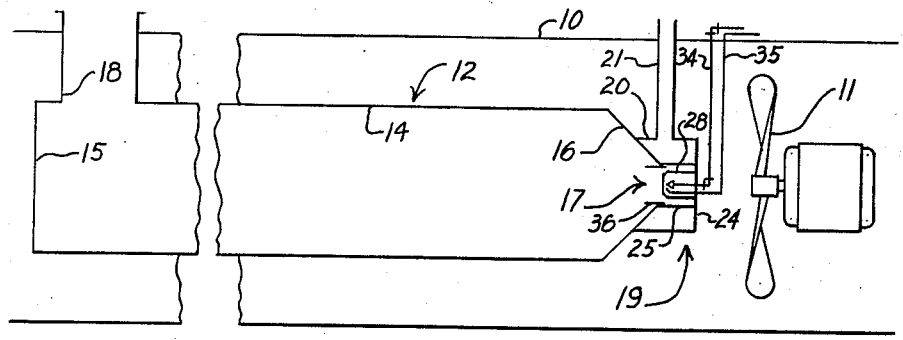
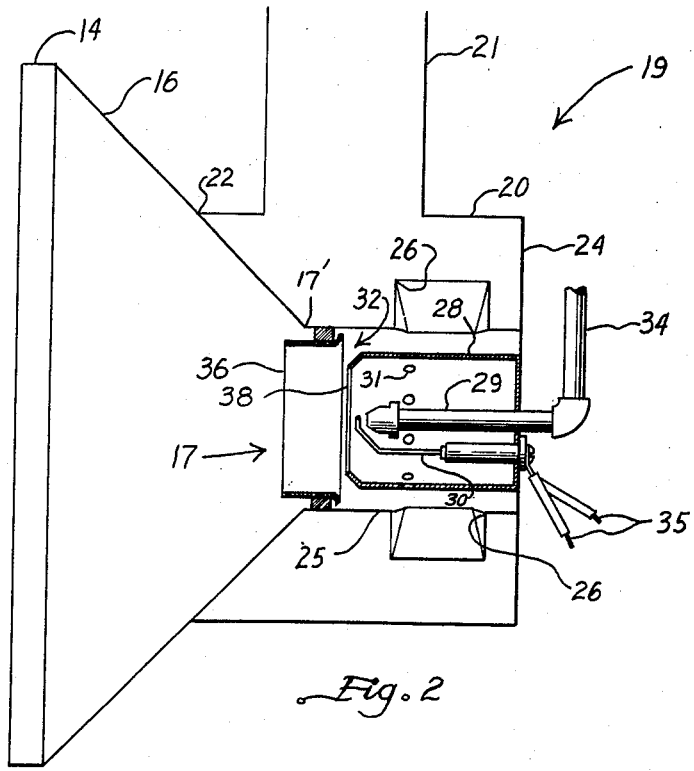

3,115,130
HEAT EXCHANGER
Shaun A. Seymour, New Holland, Pa., assignor to Sperry Rand Corporation, New Holland, Pa., a corporation of Delaware
Filed May 9, 1961, Ser. No. 108,921
2 Claims. (Cl. 126—110)

This invention relates to crop drying equipment. Specifically, it relates to improvements in the heat exchanger unit of an agricultural crop dryer.

In recent years, considerable study and progress has been made in the field of artificial, or accelerated, drying of farm crops. This eliminates the farmers dependency upon the weather for the drying of his crops; thus, eliminating one of the major uncertainties in his harvesting and curing operation.

The operation consists basically of delivering the material to an enclosure such as a drying bin in the case of loose grains or a drying building in the case of baled hay, and there driving a current of heated dry air through the crop material until the moisture content thereof has been reduced to a desired level.

The mechanism for creating the current of heated dry air comprises basically a tubular wind tunnel-type housing, a fan for forcing air through the housing and a heater, or exchanger, within the housing to heat the air passing thereover.

The heat exchanger unit comprises a closed cylindrical combustion chamber suspend concentrically within the wind tunnel housing and having a frusto-conical upstream end wall. This frusto-conical end wall facilitates the movement of air over the combustion chamber and reduces air turbulence within the tunnel. An inlet opening for a combustible fuel-air mixture is provided in the apex of the frusto-conical end wall. At the downstream end of the combustion chamber, an exhaust port is provided. The exhaust port is ducted to the outside of the wind tunnel. A conventional burner head having an ignition device and a fuel nozzle is mounted outside the combustion chamber in axial alignment with the entrance opening thereto. An air jacket surrounds the burner head and supplies combustion supporting air thereto from outside the wind tunnel. Fuel emanating from the fuel nozzle passes over the ignition device and into the combustion chamber. The combustion operation is intermittent and automatically controlled by means not a part of this invention.

It is desirable from the standpoint of safety and simplicity of operation to keep operator adjustments of the mechanism to a minimum. For economical reasons it is also desirable that certain commercially available, high production sub-components be employed in the apparatus.

It has been found that while certain drying units manufactured according to the above requirements operate satisfactorily under conditions of average and high atmospheric temperature, certain problems arise when the units are operated in cold weather. For one thing, the ignition of the fuel-air mixture is more difficult in cold weather. It has been found that by installing a wider angle spray nozzle in the burner head, satisfactory ignition occurs in cold weather as well as in average or hot weather. The use of such a nozzle, however, has proven unsatisfactory since, in cold weather the burner is forced to operate for longer periods of time than in warm weather and with shorter time intervals between operations. This has led to overheating of the frusto-conical end wall of the combustion chamber when the wide spray fuel nozzle is employed. Since under these conditions, the temperature of the frusto-conical end wall may rise above safe operating limits, it is necessary to greatly reduce the fuel oil rate to the nozzle. This prevents the overheating, but greatly reduces the overall efficiency of the apparatus.

It is an object of this invention to improve heat exchangers of the above type whereby they will perform satisfactorily under a greater range of atmospheric conditions.

It is another object of this invention to improve heat exchangers of the above type whereby they will perform satisfactorily over a greater range of atmospheric conditions without adding materially to the over-all cost of the present apparatus.

It is another object of this invention to improve heat exchangers of the above type whereby they will perform satisfactorily over a greater range of atmospheric conditions without substitution or modification of the existing sub-components.

A further object of this invention is to modify heat exchangers of the above type whereby ignition is improved under all conditions with no accompanying increase in the operating temperature of any part of the apparatus and with no reduction in operating efficiency.

Other objects will appear from the following description; reference being made therein to the accompanying drawings wherein:

FIG. 1 is a diagrammatic view representing a vertical section taken on the longitudinal axis of the hot air producing mechanism of a crop dryer unit; and FIG. 2 is an enlarged view of a portion of FIG. 1 showing the present invention; some parts being shown in vertical section and other parts being indicated diagrammatically.

With reference to FIG. 1 of the drawings, the numeral 10 indicates a cylindrical housing open at both ends to provide a wind tunnel type structure. Centrally disposed within the housing at one end thereof is a motor driven fan 11 which drives air through housing 10 from right to left as seen in FIG. 1. A heat exchanger unit generally indicated by the reference numeral 12 is concentrically disposed within housing 10 downstream from fan 11.

Heat exchanger 12 comprises a cylindrical combustion chamber 14 having a planar downstream end wall 15 and a frusto-conical upstream end wall 16. The apex, or upstream, end of the frusto-conical end wall 16 is indicated by the reference numeral 17'. This annular end of wall 16 constitutes means defining an inlet opening into the combustion chamber. The inlet opening is indicated, generally, by the numeral 17. A combustible fuel-air mixture enters combustion chamber 14 through the inlet opening 17. An exhaust opening 18 is provided adjacent the downstream end of the combustion chamber. The exhaust opening is ducted to the outside of tubular housing 10. It is common practice to provide longitudinally extending fins (not shown) on the outside of combustion chamber wall 14 to facilitate dissipation of heat into the air stream driven thereover by fan 11. A burner head and air jacket assembly 19 is mounted on the outside of combustion chamber 12 at the entrance opening 17 thereof. Fuel oil and air are delivered under pressure to this assembly, for entrance into combustion chamber 12 via opening 17, from outside the housing 10; thus rendering the combustion operation completely independent of the air current generated by fan 11.

As best seen in FIG. 2, the air jacket-burner head assembly 19 comprises an outer cylindrical air jacket 20 to which a conduit 21 delivers air under pressure. Air jacket 20 is sealed to the frusto-conical end wall 16 of the combustion chamber at 22 and has a closed upstream end wall 24. Concentrically disposed within jacket 20 is an inner air jacket 25 having cowled inlet openings 26. The downstream end of inner air jacket 25 is sealed to the outer surface of end wall 16 at its apex end 17'. The upstream end of air jacket 25 is sealed to end wall 24 of outer air jacket 20. Air delivered through conduit 21 under pressure is forced through openings 26 into air jacket 25 from which it passes through opening 17 into the combustion chamber. A burner head 28 is mounted on end wall 24 of outer air jacket 20. The burner head 28 is of smaller outside diameter than the inside diameter of inner air jacket 25 and has an open downstream end 38. A wide spray fuel nozzle 29 forms a part of the burner head. A conventional ignition device 30 is mounted within burner head 28 and has its ignition points disposed in alignment with the discharge end of fuel nozzle 29 and spaced slightly downstream therefrom. Burner head 28 is provided with a series of holes 31 through which a portion of the air delivered into air jacket 25 passes on its way into combustion chamber 14; the remainder of the combustion supporting air current passes directly into combustion chamber 14 through space 32 and opening 17. Fuel oil is delivered to nozzle 29 through a conduit 34 while an electrical current is supplied to ignition device 30 by wires 35.

A shield, or annular ring, 36 is mounted around the inner periphery of opening 17 and extends into the frusto-conical end wall 16 of the combustion chamber. The provision of this ring enables the use of a fuel nozzle having a wide enough spray angle to insure easy ignition even in cold weather while preventing overheating of end wall 16. Ring 36 narrows the fuel-air mixture spray pattern after it passes the point of ignition and directs the flame away from end wall 16.

The operation of this mechanism is as follows: A sensing device, not a part of this invention and not shown, measures the temperature of the air leaving housing 10 at the left side in FIG. 1. When this air drops below a predetermined temperature, the sensing means actuates conventional mechanism, not shown, which forces air into conduit 21, fuel oil into conduit 34 and an electrical current through wires 35. The fuel oil discharges from nozzle 29 in a fine wide spray pattern and mixes with air coming into the burner head through holes 31. This spray pattern is wide and fine enough to insure easy ignition by the electrical spark of the ignition means 30. It is also wide enough that the resulting flame may overheat frusto-conical end wall 16 in the absense of shield 36. As the ignited fuel-air mixture passes through exit opening 38 of the burner head and into the combustion chamber through opening 17, the shield 36 narrows the fuel-air mixture pattern. This is after ignition takes place. By narrowing the air current coming through opening 32 and the fuel-air mixture coming through opening 38, the shield 36 directs the flame away from end wall 16 and prevents overheating thereof.

While this invention has been described in connection with a particular embodiment thereof, it will be understood that it is capable of further modification and this application is intended to cover any variations, uses or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. In apparatus for drying crop material, means for producing a current of forced hot air comprising the combination of a tubular housing having open ends, a fan in said housing for moving a current of air into one of said ends, through said housing and out of the other of said ends, a heat exchanger disposed within said housing and over which the air current moves to be heated, said heat exchanger comprising an elongated hollow cylinder of smaller diameter than said housing mounted coaxially inside the housing, said cylinder having end walls closing the respective ends of the cylinder, the end wall at the end of the cylinder facing into said air current being a hollow frusto-cone tapering axially away from said cylinder and into said air current, means at the apex of said frusto-conical wall defining an axial inlet opening into said heat exchanger, a burner head disposed within said housing outside of said heat exchanger and in axial alignment with said inlet opening means, said burner head including a fuel nozzle spaced axially from said inlet opening means and adapted to direct a wide spray pattern of fuel axially into said inlet opening, an ignition device disposed axially between said nozzle and said inlet opening means whereby said wide spray pattern of fuel passes over said ignition device to facilitate ignition of the fuel on its way into said inlet opening, and a cylindrical shield spaced axially downstream from said burner head and extending into the frusto-conical portion of said heat exchanger through said inlet opening means to narrow said spray pattern of fuel after it passes said ignition device to direct the flame axially into said combustion chamber past the inner surface of said frusto-conical end wall.

2. In apparatus for drying crop material, means for generating a current of forced hot air comprising the combination of a tubular housing having open ends, a fan mounted within said housing for forcing a current of air therethrough, a heat exchanger disposed within said housing and over which said air current is forced by said fan, said heat exchanger comprising an elongated hollow cylinder of smaller diameter than said tubular housing mounted coaxially inside the housing, said cylinder having end walls closing the respective ends of the cylinder, the end wall at the upstream end of the cylinder relative to the direction of movement of said air current being a hollow frusto-cone tapering axially away from said cylinder and into said air current, means at the apex of said frusto-conical wall defining an axial inlet opening into said heat exchanger, a cylindrical burner head of smaller diameter than said inlet opening means mounted outside said heat exchanger and in axial alignment with said inlet opening means, said burner head having a discharge end disposed concentrically relative to said inlet opening means and spaced axially upstream from said inlet opening means, a cylindrical air jacket of larger diameter than said inlet opening means enclosing said burner head and said inlet opening means, means for delivering a current of forced air into said air jacket and burner head whereby said air current may enter said heat exchanger through said inlet opening means to support combustion therein, a fuel nozzle disposed within said burner head and spaced upstream from the discharge end of the burner head, a fuel ignition device within said burner head and disposed axially between said nozzle and said discharge end of the burner head whereby a wide spray pattern of fuel emanates from said nozzle and passes over said ignition device on its way into said combustion chamber through said inlet opening means, and a cylindrical shield spaced axially downstream from said discharge end of the burner head and extending through said inlet opening means into the frusto-conical end wall portion of said combustion chamber whereby after passing said ignition device said wide spray pattern is narrowed by said shield to direct the flame axially into said combustion chamber past the inner surface of said frusto-conical end wall.

References Cited in the file of this patent

UNITED STATES PATENTS

| | | |
|---|---|---|
| 1,130,124 | White | Mar. 2, 1915 |
| 1,774,859 | Wager | Sept. 2, 1930 |
| 2,451,625 | Marshall et al. | Oct. 19, 1948 |
| 2,541,332 | Campbell | Feb. 13, 1951 |
| 2,553,091 | Horning | May 15, 1951 |
| 2,758,590 | Besser | Aug. 14, 1956 |
| 2,780,218 | Allen | Feb. 5, 1957 |
| 2,823,909 | Sterling | Feb. 18, 1958 |
| 2,866,627 | Sherman | Dec. 30, 1958 |
| 2,964,103 | Ryder | Dec. 13, 1960 |
| 2,990,117 | Robson | June 27, 1961 |